United States Patent [19]

Tan

[11] 4,188,615

[45] Feb. 12, 1980

[54] BIT ERROR DETECTING CIRCUIT FOR USE IN A DIGITAL SIGNAL TRANSMISSION LINE

[75] Inventor: Yoichi Tan, Tokyo, Japan

[73] Assignee: Nippon Electric Co., Ltd., Tokyo, Japan

[21] Appl. No.: 933,924

[22] Filed: Aug. 15, 1978

[30] Foreign Application Priority Data

Aug. 15, 1977 [JP] Japan .................................. 52-97048

[51] Int. Cl.² ............................................. G08C 25/00
[52] U.S. Cl. ................................ 340/146.1 R; 325/41
[58] Field of Search .............. 340/146.1 R, 146.1 AX; 325/41, 42, 56, 65, 323; 328/115

[56] References Cited

U.S. PATENT DOCUMENTS

| 3,701,947 | 10/1972 | Van Der Houwen | 325/41 |
| 4,034,340 | 7/1977 | Sant'Agostino | 340/146.1 R |

OTHER PUBLICATIONS

Gooding, Performance Monitor Techniques for Digital Receivers Based on Extrapolation of Error Rate, IEEE Trans. on Comm. Tech., vol. COM-16, No. 3, Jun. 1968, pp. 380-387.

Primary Examiner—Charles E. Atkinson
Attorney, Agent, or Firm—Sughrue, Rothwell, Mion, Zinn and Macpeak

[57] ABSTRACT

A bit error detecting circuit for a digital signal transmission line of the type having a main decision circuit and a sub-decision circuit is disclosed. The purpose of the sub-decision circuit is to provide a prediction of a fault in the transmission, and this is accomplished without being adversely effected by a drift in the threshold level. A clock recovery circuit is responsive to the input digital signal to produce a clock signal which is supplied to both the main decision circuit and the sub-decision circuit and to a pattern generating circuit such as a binary counter. The main decision circuit decides the binary code of the input digital signal with respect to a first reference level. The binary code pattern from the pattern generating circuit is added to the input digital signal and the sum supplied to the sub-decision circuit which decides the binary code of the sum with respect to a second reference level. The outputs of the main decision circuit and sub-decision circuit are applied to an Exclusive OR circuit to provide a monitor output signal.

4 Claims, 7 Drawing Figures

BIT ERROR DETECTING CIRCUIT FOR USE IN A DIGITAL SIGNAL TRANSMISSION LINE

BACKGROUND OF THE INVENTION

1. Field of the Invention

The present invention relates to a bit error detecting circuit used in a control circuit for selecting a channel of lower bit error rate in a diversity communication system or the like, and more particularly to a bit error detecting circuit for a digital signal transmission line, having pseudo bit error detecting means for the prediction of any fault in the transmission.

2. Prior Art

In an analog signal transmission line, the quality of the signal being transmitted is affected directly by the decrease in the gain of the transmission line or the increase in the noise level, so that it is easy to monitor a fault on the transmission line. In contrast, in a digital signal transmission line, the high degree of noise-immunity of the transmission line makes the monitoring of the fault more difficult. In other words, a fault on the digital signal transmission line cannot be detected until the bit error occurs so frequently that the quality of the transmitted signal is heavily deteriorated at the time that the fault is detected. This means that a higher accuracy is required for the digital signal transmission with respect to the fault detection than the analog signal transmission. That is to say, the detection of the fault on the digital signal transmission line requires a system in which the fault on the transmission line is detected to take recovery steps such as channel switching prior to the deterioration of the quality of the signal.

To monitor the digital signal transmission line, use has been widely made of a method in which a pilot pulse or a frame synchronization pulse included in the transmitted signal is detected. While this method has a high reliability of the detection, fault detection cannot be achieved with it. More definitely, at the the time a bit error is beginning to occur in the frame synchronization pulse, the quality of the transmitted digital signal is deteriorated as much as the frame synchronization pulse, making the above-mentioned prediction impossible. To realize the prediction function, a system has been proposed in which a monitoring decision circuit is provided independently of the decision circuit for the signal reproduction and in which the threshold level for the binary code decision is shifted either upwards or downwards with respect to a reference voltage (for example, ground potential) in the process of reproducing the transmitted digital signal, so that a pseudo bit error is detected by the monitoring decision circuit (Reference is made to "Microwave Radio Equipment for Highly-Reliable Digital Communication System" by Seijiro Yokoyama et al, NEC RESEARCH & DEVELOPMENT, No. 39, pp. 1–11, October 1975).

The conventional bit error prediction technique outlined above has advantages such that even a slight fault on the transmission line can be detected and that desired recovery steps can be taken before the fault results in a sudden deterioration of the quality of the transmitted signal. On the other hand, however, the sensitivity of this detecting circuit for pseudo bit errors is apt to be varied due to the drift of the threshold level in the monitoring decision circuit. Such variation in the sensitivity adversely affects the prediction function directly, making the pseudo error detection unreliable.

SUMMARY OF THE INVENTION

It is, therefore, an object of the present invention to provide a bit error detecting circuit for a digital signal transmission line with a high reliability of pseudo bit error detection in which the adverse effect of the above-mentioned drift of the threshold level is minimized.

A bit error detecting circuit according to this invention comprises clock signal recovery means responsive to an input digital signal transmitted through a transmission line, for reproducing a clock signal from the input digital signal, a first decision circuit for deciding the binary code of the input digital signal with respect to a first reference level and for producing a decision output in response to the clock signal, a pattern generating circuit responsive to said clock signal for generating a predetermined binary code pattern, an adder circuit for adding the binary code pattern to the input digital signal, a second decision circuit for deciding the binary code of the output from said adder circuit with respect to a second reference level and for producing a decision output in response to the clock signal, and an Exclusive-OR circuit having an Exclusive-OR function of the first and second decision circuit outputs, whereby a fault on the transmission line is detected before the first decision circuit produces a bit error.

BRIEF DESCRIPTION OF THE DRAWINGS

The invention will now be described in greater detail with reference to the accompanying drawings, in which.

DESCRIPTION OF THE PREFERRED EMBODIMENTS

Figure 1:
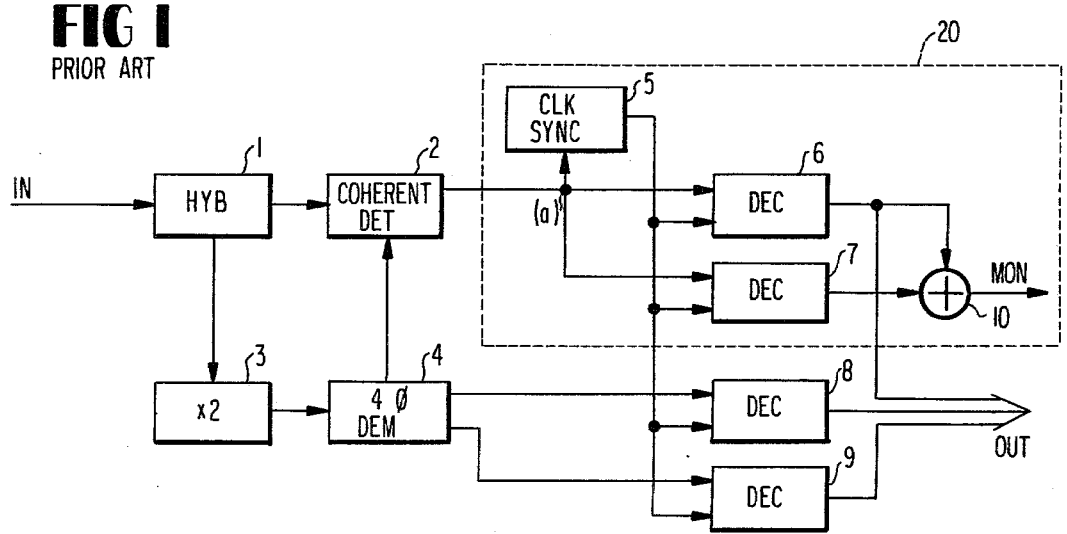
FIG. 1 is a block diagram showing an 8-phase PSK demodulator employing a conventional bit error detecting circuit.

In FIG. 1 showing an 8-phase PSK demodulator having a conventional bit error detecting circuit, an 8-phase PSK modulated IF signal is split into two by a resistor hybrid circuit 1. One of the split signal is applied directly to a coherent phase detector 2 for detecting this signal. The other signal is applied to a frequency doubler 3. The coherent phase detector 2 is supplied with a non-modulated carrier from a 4-phase demodulator 4. Then, the coherent phase detector 2 demodulates the modulated signal with the non-modulated carrier. The doubler 3 frequency-doubles this signal to provide the 4-phase PSK modulated signal. The modulated signal is then demodulated in a demodulator circuit 4. Main decision circuit 6 receives a demodulated baseband signal from coherent phase detector 2 while a demodulated baseband signal is aplied to main decision circuits 8 and 9. The main decision circuits 6, 8 and 9 are composed of, for example, a comparator amplifier and a sampling circuit decide whether the baseband signal has a binary code "1" or "0" to reproduce a data signal in response to a clock signal recovered at a clock recovery circuit 5. Reference is made to Floyd M. Gardner, *Phaselock Techniques*, pp. 117-119, John Wiley & Sons, Inc., 1966. The output signal from the phase detector 2 is also applied to a sub-decision circuit 7 to reproduce a data signal. This sub-decision circuit 7 may be composed of a comparator amplifier and a sampling circuit, like the main decision circuits 6, 8 and 9. Here, the threshold levels of the main decision circuits 6, 8 and 9 are set at the center voltage of the data signal so that the optimum bit error rate (BER) can be obtained. On the other hand, the threshold level of the sub-decision circuit 7 is set at a value slightly shifted to the positive or negative direction with respect to the center voltage so that pseudo bit errors can be detected. These threshold levels of the main and sub-decision circuits 6 and 7 are illustrated by levels $l_1$ and $l_2$ in FIG. 2, respectively. Because of the level shift of the level $l_2$ with respect to the center voltage, the sub-decision circuit 7 produces bit errors before the main decision circuit 6 produces a bit error when the transmission characteristic is deteriorated. In other words, the sub-decision circuit 7 detects what is defined herein as a pseudo bit error. The output signals from these main and sub-decision circuits 6 and 7 are applied to an Exclusive-OR circuit 10. The output signal from the Exclusive-OR circuit 10 is fed as a monitor output indicative of an abnormal condition of the transmission line to an alarm circuit and/or a switching circuit in a diversity communication system (not shown). Since the threshold level of the sub-decision circuit 7 is determined in a manner mentioned in the above, the output signal from the Exclusive-OR circuit 10 includes pseudo bit error detection components. Accordingly a bit error detecting circuit 20 having the clock recovery circuit 5, the main and sub-decision circuits 6 and 7, and the Exclusive-OR circuit 10 has the above-mentioned fault prediction function.

Figure 3:
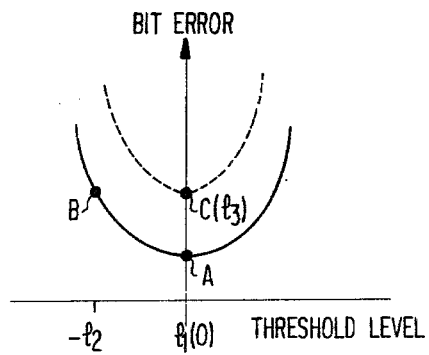
FIG. 3 illustrates a bit error vs. threshold level characteristic of the circuit shown in FIG. 1.

Description will now be made in detail of the above-mentioned prediction function with reference to FIG. 3. In FIG. 3, it is assumed that the threshold level $l_1$ of the main decision circuit 6 corresponds to a reference point 0. The threshold level of the sub-decision circuit 7 corresponds to $-l_2$. The bit errors with respect to these threshold levels $l_1(0)$ and $-l_2$ are indicated by points A and B, respectively. As will be apparent from FIG. 3, the effect of the drift of the threshold level on the bit error is very small in the vicinity of the point A. On the other hand, even a small amount of drift directly affects the detected bit error in the vicinity of the point B. In other words, the pseudo bit error detection at the sub-decision circuit 7 varies widely owing to the variation of the threshold level. This results in the production of a fault-indicating signal for a normal condition of the transmission line, or in the loss of the fault prediction function.

For further details of the circuit arrangement shown in FIG. 1, reference is made to the above-mentioned paper entitled "Microwave Radio Equipment for Highly-Reliable Digital Communication System" published in "NEC RESEARCH & DEVELOPMENT", No. 39, pp. 1-11, October 1975.

A description will now be made of an embodiment of the present invention referring to FIGS. 4, 5A, and 5B.

Figure 4:
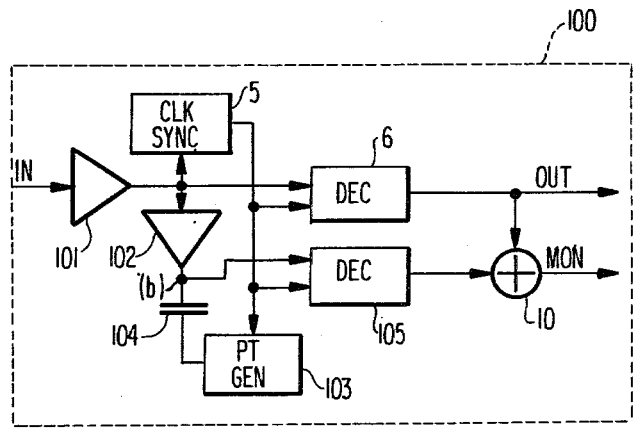
FIG. 4 is a block diagram showing one embodiment of a bit error detecting circuit according to the present invention.
Figure 5A:
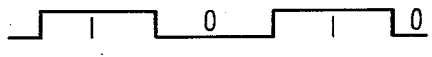
FIG. 5A and FIG. 5B illustrate a digital signal pattern and an eye pattern corresponding thereto to explain the embodiment shown in FIG. 4, respectively.

A bit error detecting circuit 100 shown in FIG. 4 is so arranged as to replace the bit error detecting circuit 20 shown in FIG. 1. In FIG. 4, like components corresponding to those in FIG. 1 are indicated by like reference numerals. The baseband signal from coherent phase detector 2 is applied to the clock recovery circuit 5, the main decision circuit 6 and a buffer amplifier 102 through an amplifier 101. The clock signal reproduced by the clock recovery circuit 5 is applied to the main decision circuit 6, a sub-decision circuit 105 and a digital pattern generating circuit 103. The main decision circuit 6 decides a binary code of the baseband signal on the basis of the threshold level and produces a decision output in response to the clock signal. Here, the threshold level of the main decision circuit 6 is set at the center voltage of the data signal so that the optimum bit error rate is obtained. On the other hand, the sub-decision circuit 105 receives a signal having an eye pattern as shown in FIG. 5B. The eye pattern shown in FIG. 5B is a pattern obtained in the following way. A repeating code 101010 . . . shown in FIG. 5A is produced by the pattern generating circuit 103 which may be composed, for example, of a binary counter. This repetition code signal is added to the baseband signal, i.e., the output signal from the buffer amplifier 102. This addition signal exhibits the eye pattern shown in FIG. 5B. Further, the threshold level of the sub-decision circuit 105 is set at substantially the same level as that of the main decision circuit 6 and is indicated as a level $l_3$ in FIG. 5B.

Figure 5B:
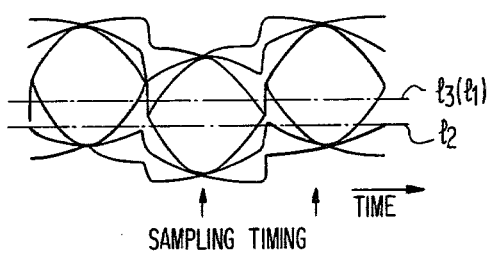

It is understood from FIG. 5B that the eye pattern at a point (b) (i.e., an input point of the sub-decision circuit 105) in FIG. 4 shifts upwards or downwards at every bit count of the received data in response to the pattern supplied from the pattern generating circuit 103. The amount of this shift corresponds substantially to $(l_2-l_1)$, i.e., a level which is sufficient to detect the pseudo bit error in the sub-decision circuit 105. As a result, the sub-decision circuit 105 has a bit error vs. threshold level characteristic as shown in FIG. 3 by a broken line curve, where the threshold level $l_3$ assumes the reference point 0. That is to say, the characteristic curve shown by the broken line is formed by translating the characteristic curve shown by the solid line in FIG. 3 upwardly along the ordinate so that the characteristic curve shown by the broken line has an increased bit error amount at the same threshold level in comparison with the characteristic curve shown by the solid line. Consequently, the threshold level $l_3$ is positioned at a point C. The bit error amount at this point C is relatively equal to the bit error amount at the point B. On the other hand, the bit error amount at the point C varies slightly with respect to the drift of the threshold level shifting upwards or downwards from the reference point 0 or the level $l_3$. This means that the sub-decision circuit 105 can detect the fault on the transmission line in the form of the pseudo bit errors, even if the fault is very small. Therefore, the sub-decision circuit 105 can attain the above-mentioned fault prediction function on the transmission line in connection with the main decision circuit 6, and the bit error is not affected by the drift of the threshold level of the sub-decision circuit 105. The output signals from the main and sub-decision circuits 6 and 105 are applied to the Exclusive-OR circuit 10, like the bit error detecting circuit shown in FIG. 1. The output signal from the Exclusive-OR circuit 10 is fed as a monitor signal for monitoring an abnormal condition of the transmission line to the alarm circuit and/or the switching circit in a diversity communication system (not shown).

Figure 6:
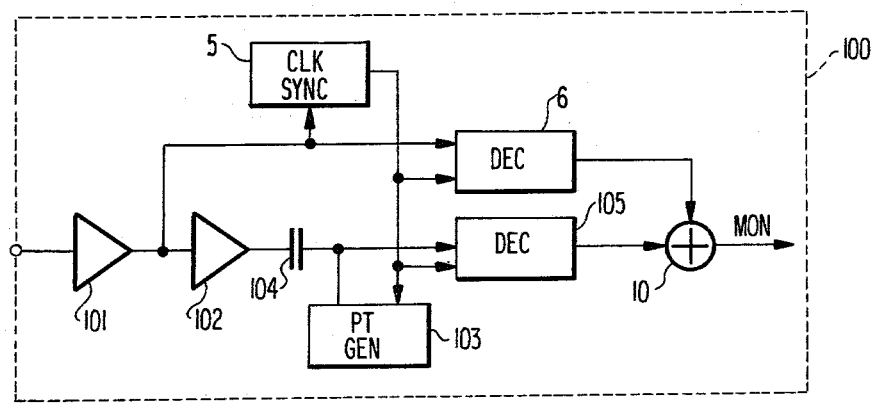
FIG. 6 is a block diagram showing a further embodiment of a bit error detecting circuit according to the present invention.

While, the output signal from the pattern generating circuit 103 may suffer drift caused by DC components, this drift is removed by a capacitor 104, making the adverse effect of the drift negligible. The sub-decision circuit 105 does not affect the transmission quality of the main signal, so that this circuit 105 may comprise a flip-flop. Such modification is more advantageous if the transmitted signal is processed on the transmitting side so that the mark rate of the signal is 1/2. In FIG. 4, the capacitor 104 for removing the DC component is arranged not on the output side of the pattern generating circuit 103, while in FIG. 6, a capacitor 104' is arranged on the output side of the buffer amplifier 102. The baseband signal from which the DC component is removed by the capacitor 104 is added to the output signal of the pattern generating circuit 103. Then, the summation output is applied to the sub-decision circuit 105. Furthermore, the capacitor 104 and 104' may be omitted.

While the above-mentioned embodiment and the modifications thereof are based on the assumption that the pattern generated by the pattern generating circuit 103 is the simplest pattern "101010 . . . ", use may be made of a pattern such as the pattern "11001100 . . . " generated by a pseudo random pattern (PN) generating circuit (Reference is made to U.S. Pat. No. 3,694,757). The circuit 100 may be used not only for the bit error detection for a demodulator as shown in FIG. 1 but also for the same purpose in any other digital signal transmission line in general.

Figure 2:
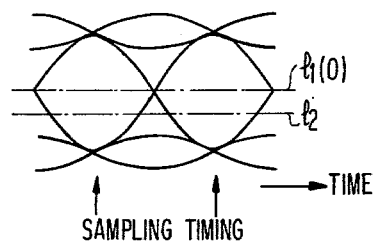
FIG. 2 illustrates an eye pattern taken at a point (a) in FIG. 1 for the case where an NRZ (Non-Return to Zero) digital signal having two levels is applied to the bit error detecting circuit shown in FIG. 1.

As explained in the above, the present invention greatly contributes to a stable operation of the bit error detecting circuit only by adding the pattern generating circuit and the capacitor to the prior art circuit shown in FIG. 1, and therefore the bit error detecting circuit according to the present invention can monitor the digital signal transmission line more exactly. In addition, the present invention also has an advantage that the circuit configuration can be simplified, like the construction of the sub-decision circuit with a flip-flop. Furthermore, in the case that the above-mentioned digital signal transmission line performs a radio PSK transmission, if the input voltage of the decision circuit at the time of the interruption of the signal has a constant value in the vicinity of the threshold level of the main decision circuit 6, it is possible that the constant value shifts upwards or downwards from the threshold level ($l_1$) of the main decision circuit 6 owing to a slight imperfection of the circuit. FIG. 2 shows that the detecting circuit 20 shown in FIG. 1 performs a normal code decision when the constant value exceeds the threshold level ($l_1$). On the contrary, in the bit error detecting circuit 100 according to the present invention, the threshold level ($l_3$) of the sub-decision circuit 105 is set equivalently above or below the threshold level of the main decision circuit 6, so that the bit error detecting circuit of the present invention can detect unfailingly the faulty state of the transmission line and the interruption of the input signal.

What is claimed is:

1. A bit error detecting circuit comprising:
   clock signal recovery means responsive to an input digital signal transmitted through a transmission line for reproducing a clock signal from said input digital signal;
   a first decision circuit for deciding a binary code of said input digital signal in accordance with a first reference level and for producing a decision output in response to said clock signal;
   a pattern generating circuit responsive to said clock signal for generating a predetermined binary code pattern;
   an adder circuit for adding said binary code pattern to said input digital signal;
   a second decision circuit for deciding a binary code of the output from said adder circuit in accordance with a second reference level and for producing a decision output in response to said clock signal; and
   an Exclusive-OR circuit having an Exclusive-OR function of the outputs of said first and second decision circuits, whereby a fault on said transmission line is detected before said first decision circuit produces a bit error.

2. A bit error detecting circuit as claimed in claim 1, wherein said pattern generating circuit generates a digital pattern signal having a mark rate substantially equal to $\frac{1}{2}$.

3. A bit error detecting circuit as claimed in claim 1, wherein said adder circuit is composed of a buffer amplifier receiving said input digital signal, a capacitor coupled to the output from said pattern generating circuit, and means for feeding the output from said buffer amplifier and the output from said capacitor to said output of said adder circuit.

4. A bit error detecting circuit as claimed in claim 1, wherein said adder circuit is composed of a buffer amplifier receiving said input digital signal, a capacitor coupled to the output from said buffer amplifier, and means for feeding the output from said pattern generating circuit and the output from said capacitor to the output of said adder circuit.

* * * * *